United States Patent [19]

Sato

[11] 3,936,664

[45] Feb. 3, 1976

[54] METHOD AND APPARATUS FOR GENERATING CHARACTER PATTERNS

[75] Inventor: Hiroshi Sato, Tokyo, Japan

[73] Assignee: Fuji Xerox Co., Ltd., Tokyo, Japan

[22] Filed: Sept. 24, 1974

[21] Appl. No.: 508,850

[30] Foreign Application Priority Data

Sept. 25, 1973 Japan .............................. 48-106946

[52] U.S. Cl. ...... 235/151; 340/324 M; 340/324 AD

[51] Int. Cl.[2] ............................................ H04N 3/00

[58] Field of Search .. 235/151; 340/324 AD, 324 M

[56] References Cited

UNITED STATES PATENTS 3,444,319 5/1969 Artzt et al. .................. 340/324 AD 3,569,951 3/1971 Lavenir .......................... 340/324 A 3,668,687 6/1972 Hale .............................. 340/324 AD

*Primary Examiner*—Eugene G. Botz

*Attorney, Agent, or Firm*—Gerald J. Ferguson, Jr.; Joseph J. Baker

[57] ABSTRACT

Apparatus for generating a character pattern comprising vector producing means for sequentially producing a plurality of vectors comprising the character pattern; and first storing means for storing the vectors where the configuration of the vectors in the first storing means corresponds to the configuration of the character pattern so that display or recording thereof is readily effected.

6 Claims, 11 Drawing Figures

FIG. 1a
FIG. 1b
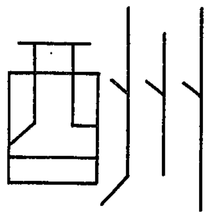
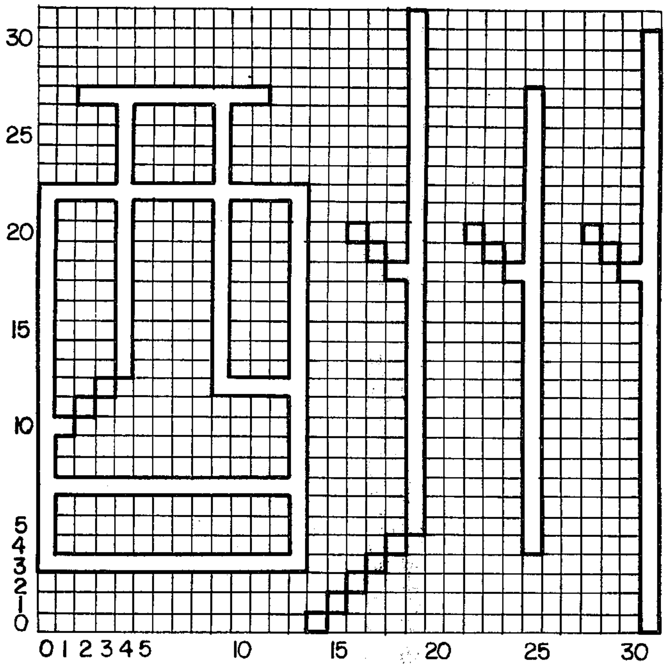
FIG. 2

FIG. 3
| | X-AXIS ADDRESS | | | | | Y-AXIS ADDRESS | | | | | ANGLE CODE | | VECTOR LENGTH | | | | |
|---|---|---|---|---|---|---|---|---|---|---|---|---|---|---|---|---|---|
| * | 0 | 0 | 0 | 0 | 0 | 0 | 0 | 0 | 0 | 0 | 0 | 0 | 1 | 0 | 0 | 0 | 1 |
| a | 0 | 0 | 0 | 1 | 0 | 1 | 1 | 0 | 1 | 1 | 0 | 0 | 0 | 1 | 0 | 1 | 0 |
| b | 0 | 0 | 0 | 0 | 0 | 0 | 0 | 0 | 1 | 1 | 1 | 0 | 1 | 0 | 1 | 0 | 0 |
| c | 0 | 0 | 0 | 0 | 1 | 1 | 0 | 1 | 1 | 0 | 0 | 0 | 0 | 1 | 1 | 0 | 1 |
| d | 0 | 1 | 1 | 0 | 1 | 0 | 0 | 0 | 1 | 1 | 1 | 0 | 1 | 0 | 0 | 1 | 1 |
| e | 0 | 0 | 1 | 0 | 0 | 0 | 1 | 1 | 0 | 1 | 1 | 0 | 0 | 1 | 1 | 1 | 0 |
| f | 0 | 0 | 0 | 0 | 1 | 0 | 1 | 0 | 1 | 0 | 0 | 1 | 0 | 0 | 0 | 1 | 1 |
| g | 0 | 1 | 0 | 0 | 1 | 0 | 1 | 1 | 0 | 0 | 1 | 0 | 0 | 1 | 1 | 1 | 1 |
| h | 0 | 1 | 0 | 1 | 0 | 0 | 1 | 1 | 0 | 0 | 0 | 0 | 0 | 0 | 0 | 1 | 1 |
| i | 0 | 0 | 0 | 0 | 1 | 0 | 0 | 1 | 1 | 1 | 0 | 0 | 0 | 1 | 1 | 0 | 0 |
| j | 0 | 0 | 0 | 0 | 1 | 0 | 0 | 0 | 1 | 1 | 0 | 0 | 0 | 1 | 1 | 0 | 0 |
| k | 1 | 0 | 0 | 1 | 0 | 1 | 0 | 0 | 1 | 0 | 1 | 1 | 0 | 0 | 0 | 1 | 1 |
| m | 1 | 0 | 0 | 1 | 1 | 0 | 0 | 1 | 0 | 1 | 1 | 0 | 1 | 1 | 0 | 1 | 1 |
| n | 0 | 1 | 1 | 1 | 0 | 0 | 0 | 0 | 0 | 0 | 0 | 1 | 0 | 0 | 1 | 0 | 1 |
| p | 1 | 1 | 0 | 0 | 0 | 1 | 0 | 0 | 1 | 0 | 1 | 1 | 0 | 0 | 0 | 1 | 1 |
| q | 1 | 1 | 0 | 0 | 1 | 0 | 0 | 1 | 0 | 0 | 1 | 0 | 1 | 1 | 0 | 0 | 0 |
| r | 1 | 1 | 1 | 0 | 1 | 1 | 0 | 0 | 1 | 0 | 1 | 1 | 0 | 0 | 0 | 1 | 1 |
| s | 1 | 1 | 1 | 1 | 1 | 0 | 0 | 0 | 0 | 0 | 1 | 0 | 1 | 1 | 1 | 1 | 1 |
FIG. 4
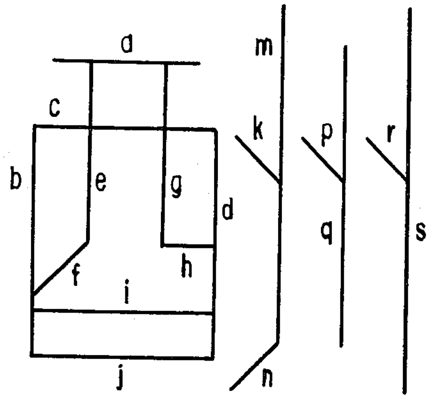
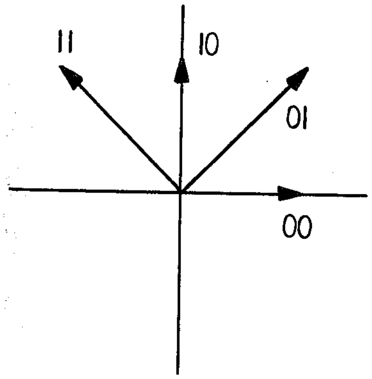
FIG. 5

| | Y-AXIS 12 | X-AXIS 13 |
|---|---|---|
| 00 | N | I |
| 01 | I | I |
| 10 | I | N |
| 11 | I | D |

I = INCREMENT
D = DECREMENT
N = NO ACTION

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 31 - | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 |
| 30 - | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 1 |
| 29 - | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 1 |
| 28 - | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 1 |
| 27 - | 0 | 0 | 1 | 1 | 1 | 1 | 1 | 1 | 1 | 1 | 1 | 1 | 0 | 0 | 0 | 0 | 0 | 0 | 0 | 1 | 0 | 0 | 0 | 0 | 0 | 1 | 0 | 0 | 0 | 0 | 0 | 1 |
| 26 - | 0 | 0 | 0 | 0 | 1 | 0 | 0 | 0 | 0 | 1 | 0 | 0 | 0 | 0 | 0 | 0 | 0 | 0 | 0 | 1 | 0 | 0 | 0 | 0 | 0 | 1 | 0 | 0 | 0 | 0 | 0 | 1 |
| 25 - | 0 | 0 | 0 | 0 | 1 | 0 | 0 | 0 | 0 | 1 | 0 | 0 | 0 | 0 | 0 | 0 | 0 | 0 | 0 | 1 | 0 | 0 | 0 | 0 | 0 | 1 | 0 | 0 | 0 | 0 | 0 | 1 |
| 24 - | 0 | 0 | 0 | 0 | 1 | 0 | 0 | 0 | 0 | 1 | 0 | 0 | 0 | 0 | 0 | 0 | 0 | 0 | 0 | 1 | 0 | 0 | 0 | 0 | 0 | 1 | 0 | 0 | 0 | 0 | 0 | 1 |
| 23 - | 0 | 0 | 0 | 0 | 1 | 0 | 0 | 0 | 0 | 1 | 0 | 0 | 0 | 0 | 0 | 0 | 0 | 0 | 0 | 1 | 0 | 0 | 0 | 0 | 0 | 1 | 0 | 0 | 0 | 0 | 0 | 1 |
| 22 - | 1 | 1 | 1 | 1 | 1 | 1 | 1 | 1 | 1 | 1 | 1 | 1 | 1 | 1 | 0 | 0 | 0 | 0 | 0 | 1 | 0 | 0 | 0 | 0 | 0 | 1 | 0 | 0 | 0 | 0 | 0 | 1 |
| 21 - | 1 | 0 | 0 | 0 | 1 | 0 | 0 | 0 | 0 | 1 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 20 - | 1 | 0 | 0 | 0 | 1 | 0 | 0 | 0 | 0 | 1 | 0 | 0 | 0 | 1 | 0 | 0 | 1 | 0 | 0 | 1 | 0 | 0 | 1 | 0 | 0 | 1 | 0 | 0 | 1 | 0 | 0 | 1 |
| 19 - | 1 | 0 | 0 | 0 | 1 | 0 | 0 | 0 | 0 | 1 | 0 | 0 | 0 | 1 | 0 | 0 | 0 | 1 | 0 | 1 | 0 | 0 | 0 | 1 | 0 | 1 | 0 | 0 | 0 | 1 | 0 | 1 |
| 18 - | 1 | 0 | 0 | 0 | 1 | 0 | 0 | 0 | 0 | 1 | 0 | 0 | 0 | 1 | 0 | 0 | 0 | 0 | 1 | 1 | 0 | 0 | 0 | 0 | 1 | 1 | 0 | 0 | 0 | 0 | 1 | 1 |
| 17 - | 1 | 0 | 0 | 0 | 1 | 0 | 0 | 0 | 0 | 1 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 16 - | 1 | 0 | 0 | 0 | 1 | 0 | 0 | 0 | 0 | 1 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 15 - | 1 | 0 | 0 | 0 | 1 | 0 | 0 | 0 | 0 | 1 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 14 - | 1 | 0 | 0 | 0 | 1 | 0 | 0 | 0 | 0 | 1 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 13 - | 1 | 0 | 0 | 0 | 1 | 0 | 0 | 0 | 0 | 1 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 12 - | 1 | 0 | 0 | 1 | 0 | 0 | 0 | 0 | 0 | 1 | 1 | 1 | 1 | 1 | 0 | 0 | 0 | 0 | 0 | 1 | 0 | 0 | 0 | 0 | 0 | 1 | 0 | 0 | 0 | 0 | 0 | 1 |
| 11 - | 1 | 0 | 1 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 10 - | 1 | 1 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 9 - | 1 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 8 - | 1 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 7 - | 1 | 1 | 1 | 1 | 1 | 1 | 1 | 1 | 1 | 1 | 1 | 1 | 1 | 1 | 0 | 0 | 0 | 0 | 0 | 1 | 0 | 0 | 0 | 0 | 0 | 1 | 0 | 0 | 0 | 0 | 0 | 1 |
| 6 - | 1 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 5 - | 1 | 0 | 0 | 0 | 0 | 0 | 0 | 0 | 0 | 0 | 0 | 0 | 0 | 1 | 0 | 0 | 0 | 0 | 0 | 1 | 0 | 0 | 0 | 0 | 0 | 1 | 0 | 0 | 0 | 0 | 0 | 1 |
| 4 - | 1 | 0 | 0 | 0 | 0 | 0 | 0 | 0 | 0 | 0 | 0 | 0 | 0 | 1 | 0 | 0 | 0 | 0 | 1 | 0 | 0 | 0 | 0 | 0 | 0 | 1 | 0 | 0 | 0 | 0 | 0 | 1 |
| 3 - | 1 | 1 | 1 | 1 | 1 | 1 | 1 | 1 | 1 | 1 | 1 | 1 | 1 | 1 | 0 | 0 | 0 | 1 | 0 | 0 | 0 | 0 | 0 | 0 | 0 | 0 | 0 | 0 | 0 | 0 | 0 | 1 |
| 2 - | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 1 |
| 1 - | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 1 |
| 0 - | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 1 |
| | 0 | | | | | 5 | | | | | 10 | | | | | 15 | | | | | 20 | | | | | 25 | | | | | 30 | |

FIG. 8

METHOD AND APPARATUS FOR GENERATING CHARACTER PATTERNS

BACKGROUND OF THE INVENTION

1. Field of the Invention

The present invention relates to a method and apparatus for generating characters and symbols (hereinafter referred to as character patterns) for recording or display.

2. Discussion of the Prior Art

Conventionally, character patterns have been generated by information processing systems having fixed memories which store information for as many classifications of characters as are required where the characters are selected by instructions employed within the information system. However, in such systems, the required capacity of each fixed memory is subject to considerable fluctuation depending on the method of standardization of each character arrayed into the storage matrix. Therefore, effective and efficient standardization or to state it otherwise, a method of reducing required memory capacity has lately been a matter of concern.

Referring to FIG. 1*a*, there is shown a Japanese character, which might be displayed. This character is simplified in FIG. 1*b* where only linear sections or vectors of the character are shown. In conventional systems, the respective linear lines or vectors are sequentially displayed until the entire character is displayed. Thus, the entire character may appear in a matrix display system of 32 dots × 32 dots, for example, as shown in FIG. 2. Memory capacity in such vector display systems may be reduced by a factor of approximately one third compared to those systems where all the bits or dots of the display matrix are stored in memory on a black-and-white basis. However, when using the vector display systems, each character is continuously reproduced vector by vector; therefore, such systems are impractical when recording or displaying with a cathode-ray tube utilizing conventional raster scanning or a multiple stylus system.

SUMMARY OF THE INVENTION

Primary objects of this invention are the provision of a method and apparatus for overcoming the problems of the prior art as set forth above and the provision of a method and apparatus for generating a character pattern utilizable with various display and recording systems.

Other objects and advantages of this invention will be apparent from a reading of the following specification and claims taken with the drawing.

BRIEF DESCRIPTION OF THE DRAWING

FIG. 1*a* is an illustration of a Japanese character intended for display or recording.

FIG. 1*b* is an illustration of the character of FIG. 1*a* with the strokes thereof reduced to straight line segments or vectors.

FIG. 2 is an illustration of a display matrix of 1,024 bits wherein the character of FIG. 1*b* is displayed.

FIG. 3 is an illustration of a predetermined portion of a memory comprising a block or table of vector control words corresponding to the vectors constituting the character of FIG. 1*b*.

FIG. 4 is an illustration of the character of FIG. 1*b* showing the correspondence between the vectors of FIG. 1*b* with the vector control words of FIG. 3.

FIG. 5 is a graph illustrating the relation between vector direction and the corresponding code assigned thereto.

FIG. 8 is an illustration of the random access memory of FIG. 6 showing the character of FIG. 1*b* generated therein.

DETAILED DESCRIPTION OF PREFERRED EMBODIMENT OF THE INVENTION

Figure 6:
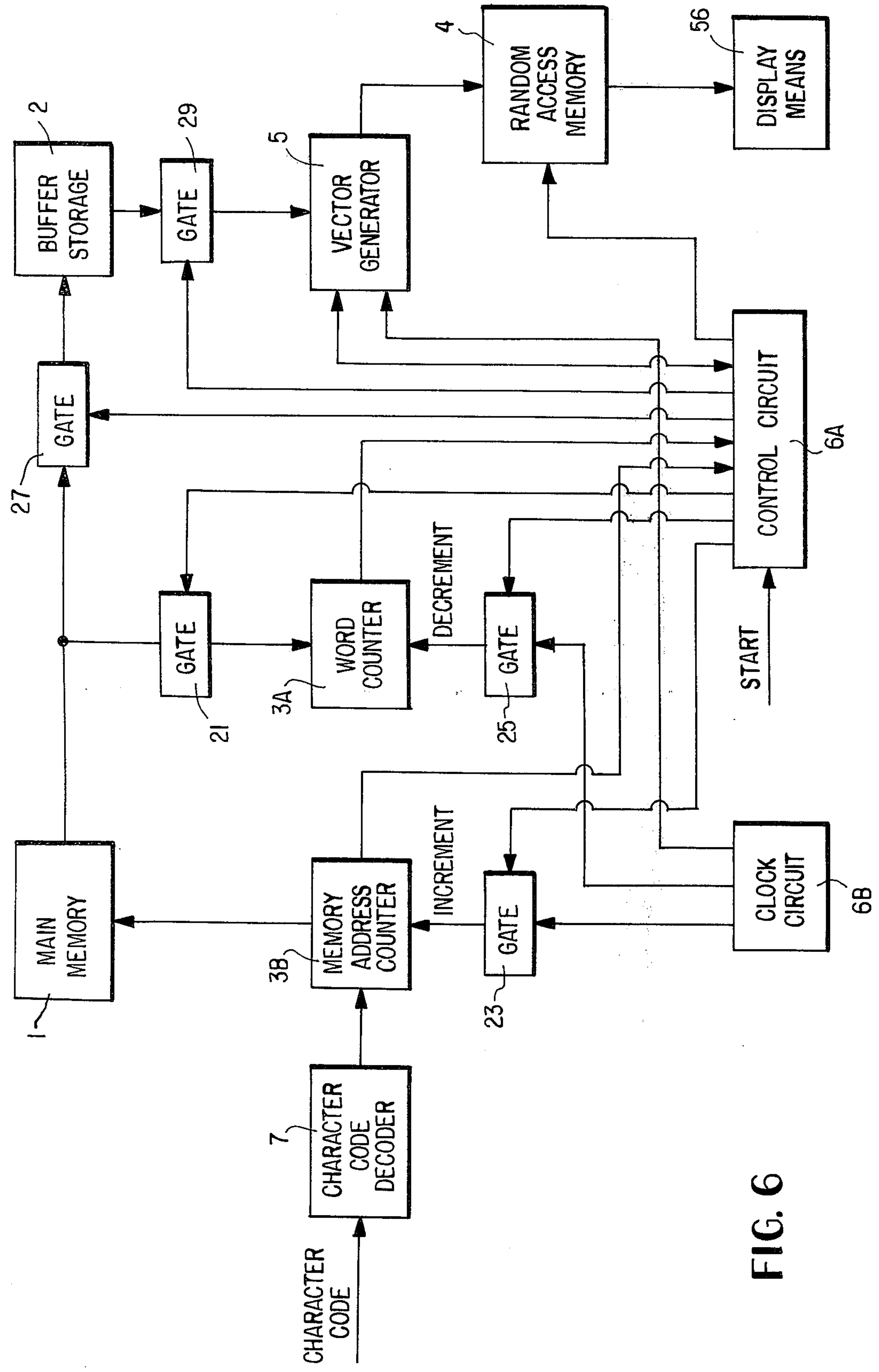
FIG. 6 is a block diagram of an illustrative overall system in accordance with the invention.

Reference should now be made to the drawing where like reference numerals refer to like circuit elements.

In FIG. 6, it will hereinafter be assumed that an instruction, represented by the character code applied to a character code decoder 7, is given by a computer (not shown) to display the Japanese character of FIG. 1*b*. Information corresponding to this character is prestored in a predetermined portion of memory 1, this portion being illustrated in FIG. 3. The rows or memory addresses a thru s respectively contain information on the vectors or line segments *a* through *s* (see FIG. 4) of the character of FIG. 1*b*. Each of the rows contains a vector control word where the first through fifth bits contain the X-coordinates of the starting points of the vectors, the sixth through 10th bits contain the Y-coordinates of the starting points on the vectors, the 11th and 12th bits contain the directions (angles of) the vectors, and the 13th through 17th bits contain the lengths of the vectors. Thus, vector *a* of FIG. 4 stored in memory address a of main memory 1 has X and Y starting points of (2, 27), an orientation angle (see FIG. 5) of 0°, and a length of 10 bits or dots where this information is stored in binary notation and thus is stored as (00010) (11011) (00) (01010).

In addition to the above, a memory word *, which is the first word of the predetermined memory block of FIG. 3 is provided. Stored within address * is a special control word indicating the number of vectors comprising the character to be displayed. In FIG. 3, the character comprises 17 vectors.

The overall construction of a preferred embodiment of the invention is shown in FIG. 6 where a character code decoder 7 is responsive to the character code which may be provided in various forms such as an instruction from a general purpose computer (not shown), which might share a main memory 1. The decoded code is applied to a memory address counter 3B, the contents of counter 3B corresponding to the first address of a predetermined portion of main memory 1. This predetermined portion or block might correspond to that shown in FIG. 3. Memory address counter 3B is connected to main memory 1 and the contents thereof determine which location of main memory 1 is to be processed. The contents of this location are applied to either a gate 21 or a gate 27 under the control of a control circuit 6A, which will be described in more detail hereinafter with respect to FIG. 9. Control circuit 6A also controls a gate 23 to apply clock pulses from a clock circuit 6B to increment memory address counter 3B each time a new vector is to be processed. A word counter 3A has gated thereto via gate 21 the contents of memory address * whereby counter 3A initially contains a count of the total number of vectors to be processed for the character whose pattern is currently being generated. Thus, for the character of FIG. 4, the contents of word counter 3A would initially be 17. As each vector is processed, the contents of counter 3A are decremented by clock circuit 6B via a gate 25 under the control circuit 6A.

The vector control words are sequentially applied via gate 27 to a buffer storage 2 and thence to a vector generator 5 via a gate 29 under the control of circuit 6A. As will be described in more detail hereinafter with respect to FIG. 7, vector generator 5 is responsive to the vector control words shown in FIG. 3 (that is, the coordinates of the starting point of each vector and the length and direction thereof) to store in a random access memory 4 the configuration of each vector so that when the entire character pattern has been generated, the configuration thereof will be stored in memory 4 as is illustrated in FIG. 8. This is effected by applying pulses from circuit 6A under the control of the vector control words stored in buffer storage 2. Thus, the configuration of the character pattern stored in memory 4 is such that it is readily utilized by conventional display and/or recording means such as cathode ray tubes or multiple stylus systems. Hence, memory 4 and its associated circuitry as shown in FIG. 6 renders the vector display method of character generation compatible with such conventional display and/or recording systems whereas, heretofore, the vector display method of character pattern generation was incompatible with such systems since the vectors had to be regenerated each time the character was generated and thus the amount of time consumed in doing this rendered this method incompatible with many conventional display and/or recording systems. The output of memory 4 is shown in FIG. 6 connected to a display means 56, which also may be a recording system as stated above.

Figures 7, 10:
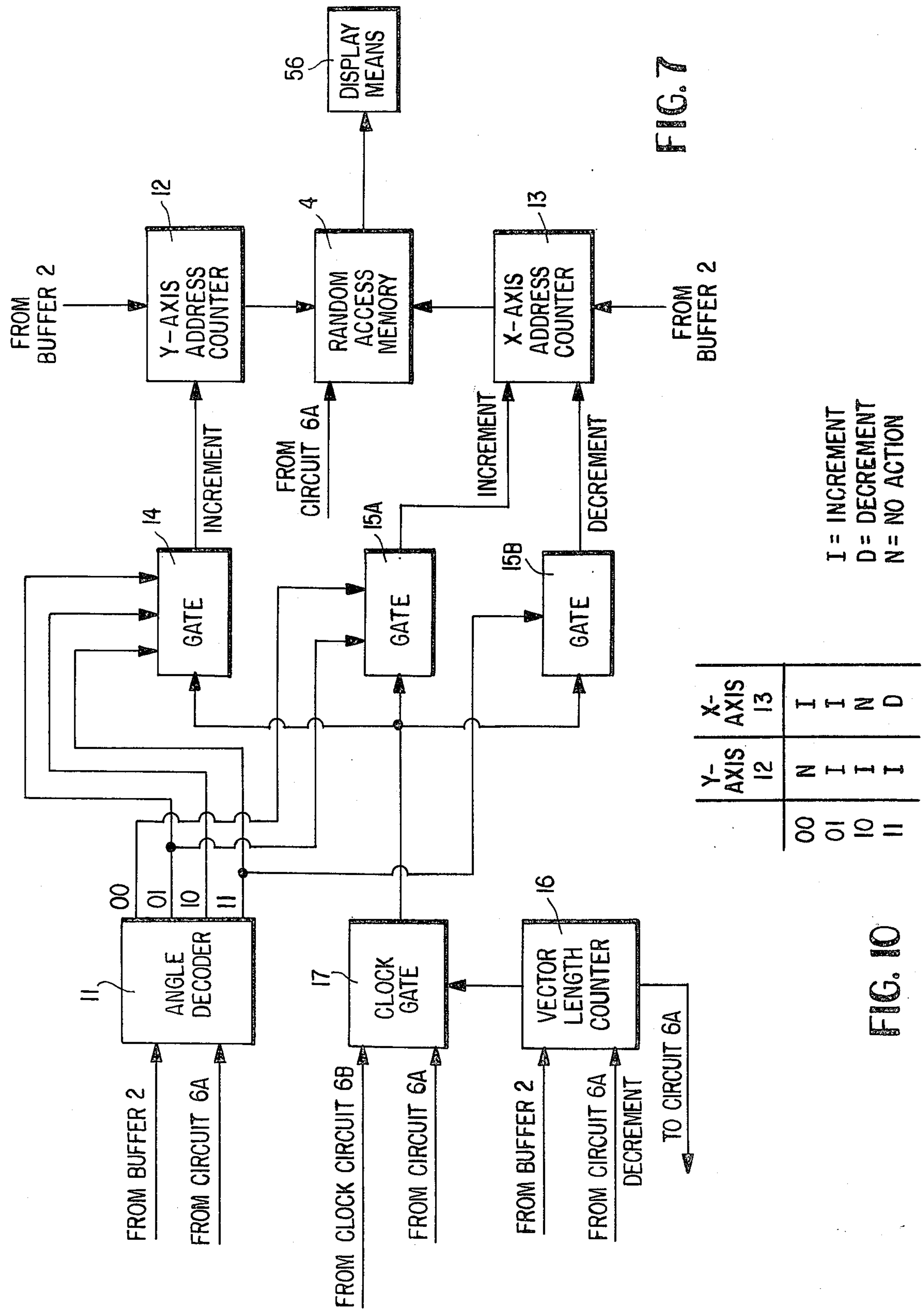
FIG. 7 is an illustrative block diagram of the vector generator of FIG. 6.
FIG. 10 is a truth table illustrating the operation of certain portions of the circuitry of FIG. 7.

Referring now to FIG. 7, there is illustrated in further detail, the vector generator 5 of FIG. 6. This generator comprises a Y-axis address counter 12 and a X-axis address counter 13 respectively connected to random access memory 4. X-axis counter 13 is loaded from buffer storage 2 with the X-axis address in memory 4 of the starting point of the vector currently being processed, the X-axis address portion of the vector control words being shown in FIG. 3. Y-axis counter 12 is also loaded from buffer storage 2 with similar information corresponding to the Y-coordinate of the starting point address of the vector. As will be described in more detail hereinafter with respect to FIG. 9, each dot or bit constituting a vector is loaded from control circuit 6A after counters 12 and 13 have been loaded.

For each vector, memory 4 will be sequentially loaded with bits until the entire vector has been inserted therein. This is controlled by a vector length counter 16, which is loaded from buffer storage 2 with the vector length portion of the FIG. 3 vector control words. Counter 16 conditions a clock gate 17 to gate clock pulses to three gates 14, 15A and 15B to control the loading of bits into memory 4, as will be described in more detail hereinafter. As each bit of a vector is loaded in memory 4, counter 16 is decremented by a signal from circuit 6A until the counter contents are reduced to zero, at which time processing of the next vector is initiated. Detection of the latter condition occurs in circuit 6A as will be described hereinafter with respect to FIG. 9.

The placement of successive bits into memory 4 depends on the direction of the vector currently being processed. As can be seen in FIG. 5, the direction of each vector can have is limited to 0°, 45°, 90° and 135°. These directions or angular orientations are respectively assigned the codes of 00, 01, 10 and 11. These codes are provided in the angle code portion of the FIG. 3 vector control words. Angle decoder 11 is successively loaded from buffer storage 2 with the angle code portion of each vector. The operation of decoder 11 is illustrated in FIG. 10 where shown in the first column are the possible angle codes which can be applied to decoder 11. Decoder 11 has four outputs, one of which is energized depending upon the code applied thereto. Circuitry for implementing a function such as this is well known and described in the text "Pulse and Digital Circuits" by J. Millman & H. Taub, McGraw-Hill Book Company, 1956, pp. 422 and 423. The outputs of decoder 11 control gates 14, 15A and 15B, which, in turn, increment and/or decrement counters 12 and 13 depending on the particular orientation of the vector being currently processed. Thus, for example, if a horizontal vector were being processed, its code would be 00 and as each bit corresponding to this vector was loaded into memory 4, the contents of X-axis counter 13 would be incremented by one while the contents of Y-axis counter 12 would remain unchanged so that successive bits would be inserted into memory 4 one bit location to the right of the previously inserted bit. The foregoing action with respect to counters 12 and 13 is illustrated in the truth table of FIG. 10, which also illustrates how counters 12 and 13 are changed for the other angle codes. As can be seen in FIG. 7, the connections between decoder 11 and gates 14, 15A and 15B implement the functions described in the truth table of FIG. 10.

At this point, it should be appreciated that in this preferred embodiment, the configuration of the character pattern stored in memory 4 exactly corresponds to the configuration of the character pattern to be displayed and/or recorded. However, the configuration of the pattern stored in memory 4 need not exactly correspond since if there is not exact correspondence, this can be rectified by adjusting the connections from memory 4 to the display and/or recording means. However, it is important that all vectors comprising the character be stored in memory 4 before display and/or recording of the character pattern.

Figure 9:
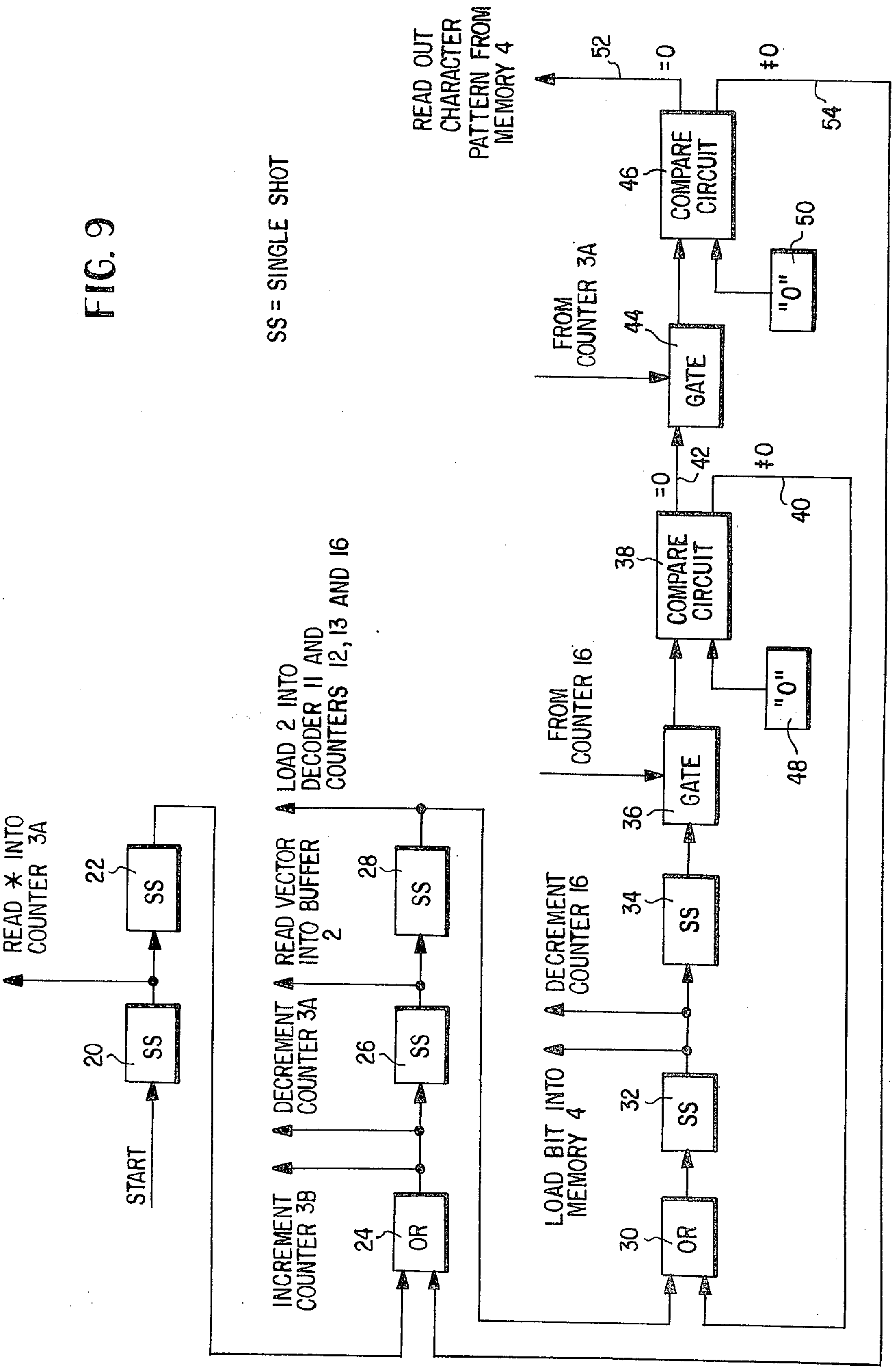
FIG. 9 is an illustrative block diagram of the control circuit of FIG. 6.

Reference should now be made to FIG. 9, where there is shown in further detail the control circuit 6A of FIG. 6. A single shot 20 is responsive to a START signal, which occurs at the time the character code is applied to decoder 7 and the decoded address of the first location of the memory block of FIG. 3 is applied to memory address counter 3B. Single shot 20 may be a conventional monostable multivibrator. The output of single shot 20 is applied to gate 21 of FIG. 6 to gate the count of the total number of vectors comprising the character pattern into word counter 3A. The output of single shot 20 is also applied to a single shot 22. The output of single shot 22 is applied to a OR circuit 24, the output of which is applied to gate 23 to increment memory address counter 3B preparatory to processing of the first vector in the memory block to FIG. 3. The output of OR circuit 24 is also applied to gate 25 to decrement word counter 3A whereby the contents of counter 3A will eventually be reduced to 0 thereby indicating that the entire character pattern has been generated. The output of OR circuit 24 is also applied to a single shot 26.

The output of single shot 26 is applied to gate 27 to load the first vector control word into buffer storage 2. The output of single shot 26 is also applied to a single shot 28, the output of which is applied to gate 29 of FIG. 6 and angle decoder 11 whereby the X-axis address is loaded into counter 13, the Y-axis address is located into counter 12, the angle code is applied to angle decoder 11, and the vector length is loaded into vector length counter 16. The output of single shot 28 is also applied to an OR circuit 30.

The output of OR circuit 30 is applied to a single shot 32, the output of which is applied to random access memory 4 (see FIG. 7) to cause a bit to be loaded in memory 4, the location of the loaded bit depending on the contents of counters 12 and 13, as described above. The output of single shot 32 is also applied to vector length counter 16 to decrement the contents thereof by one and thus indicate that a bit of the vector currently being processed has been loaded into memory 4. The output of single shot 32 is also applied to a single shot 34, the output of which is applied to a gate 36 to gate the contents of counter 16 to a compare circuit 38. The contents of counter 16 are compared with zero, which is applied to compare circuit 38 from a zero store circuit 48. If the contents of counter 16 have not been reduced to zero, an output line 40 is energized to produce another signal thru OR circuit 30 whereby the functions described above for blocks 30 – 38 are repeated until the contents of counter 16 are reduced to zero whereby indicating complete loading of the current vector into memory 4.

At this time an output line 42 is energized to gate the contents of word counter 3A via a gate 44 to a compare circuit 46. Also applied to circuit 46 is a zero from a zero store circuit 50. If the contents of counter 3A have not been reduced to zero, an output line 54 is energized to apply another signal to OR circuit 24 whereby the next vector control word in the memory block of FIG. 3 is processed in the manner described above. The successive control words are thus processed until the contents of counter 3A are reduced to 0 thereby indicating that the complete character has been generated. At this time, output line 52 of compare circuit 46 is energized. Energization of this line may effect read out of the character pattern stored in memory 4, as indicated in FIG. 9, or any other desired function may be implemented at this time.

Referring to the Figures, the overall operation of the invention may be described as follows. Operation is commenced by the application of a character code to decoder 7 and a START signal to control circuit 6A, as shown in FIG. 6. The decoder character code in decoder 7 is the address in main memory 1 of the character to be displayed and is applied to memory address counter 3B. The START signal actuates single shot (monostable) multivibrator 20, which reads out the contents of the first word (*) of the character to be displayed. This is gated into word counter 3A via gate 21. The output from single shot 20 also triggers single shot 22 which is applied to an OR circuit 24 and thence, it increments memory address counter 3B by one via gate 23 and decrements word counter 3A by one via gate 25. Thus, counter 3B now contains the address of the first vector of the character to be displayed.

After another delay established by single shot 26, the first vector is read into buffer storage 2 via gate 27. Next, after a delay established by single shot 28, the contents of buffer 2 are selectively loaded into angle decoder 11, Y-axis address counter 12, X-axis address counter 13, and vector length counter 16 via gate 29. After a delay established by single shot 32, a bit is loaded into random access memory 4, in a manner which will be described in more detail hereinafter with respect to FIG. 7 and the contents of counter 16 are decremented by one. After a delay established by single shot 34, a test is made to see if any more bits corresponding to the current vector are to be loaded in memory 4. This test is made by gating the contents of counter 16 to compare circuit 38 via gate 36 where a comparison is made with the number zero, stored in zero store 48. If there are more bits to be stored, the contents of counter 16 will be greater than zero and the non-zero output 40 of compare circuit 38 is energized to store the next bit of the current vector into memory 4. This is effected by looping again through OR circuit 30, single shot 32 and single shot 34.

The test for determining whether the vector has been completely stored in memory 4 is again made. Assuming that the vector has been completely stored, the zero output 42 of compare circuit 38 will be energized, at which time another different test will be performed. This test determines whether all of the vectors stored in main memory 1 have been stored in memory 4 by comparing the contents of word counter 3A with zero which is stored in zero store 50. If not, the non-zero output 54 of compare circuit 46 is energized and the steps commencing with OR circuit 24 are repeated to process the next vector in memory 1. Each bit of this next vector is processed by the loop including OR circuit 30, single shot 32 and single shot 34 in the manner described above for the previous vector. Another test is then made to determine if all vectors stored in memory 1 have been processed. If so, the zero output 52 of compare circuit 46 is energized to read the character pattern stored in memory 4. As indicated in FIG. 8, the configuration of bits stored in memory 4 corresponds to that displayed at the display means 46. These bits could be displayed in a number of known ways and, for example, could be displayed on a television raster where there are 32 bits for each line and 32 lines for each picture or frame.

Referring to FIG. 7, the vector generator 5 and the operation thereof is described in further detail. Thus, as brought out in FIG. 5, the vector 00 is parallel to the X-axis. Assuming, the left-most bit of a 00 vector is specified first, the X-axis counter 13 should be incremented each time a new bit is stored in memory 4 for this vector, as is illustrated in FIG. 10. This is effected by gating the clock pulses from gate 17 through gate 15A under the control of the 00 output from angle decoder 11.

Assuming that a 01 vector is decoded, both the X and Y-axis counters are incremented. This is effected by gating the clock pulse from gate 17 through gates 14 and 15A under the control of the 01 output from decoder 11. As can be seen in FIG. 10, for a 10 vector (parallel to the Y-axis), counter 12 is incremented (assuming the lowest bit is first specified for this vector) and no action is taken with respect to the X-axis counter. For an 11 vector, counter 12 is incremented for each bit of the vector while counter 13 is decremented for each bit thereof, assuming that the lowest, right-most bit of the vector is specified first.

In order to further illustrate the processing of a particular vector of the memory block of FIG. 3, reference should be made to vector *n*. As can be appreciated from FIG. 3, the X-axis and the Y-axis coordinates of the starting point of this vector are (14, 0) its angular orientation is 45° and its length is 5 bits or dots. Thus, in the manner described hereinbefore, the numbers 14 and 0 will be respectively loaded in counters 13 and 12, the code 01 will be applied to the decoder 11, and the number 5 will be loaded into counter 16. The first bit thus loaded in memory 4 will be located at point (14, 0) of FIG. 8. Before the next bit is loaded in memory 4, a clock pulse from circuit 6B will be applied to counters 12 and 13 so that the respective contents thereof will define the point (15, 1). The foregoing is effected, as can be seen in FIG. 7, by the fact that the 01 output line of decoder 11 is energized and thus gates 14 and 15A are conditioned to pass the clock pulse from gate 17 to counters 12 and 13 and thus increment the respective counters thereof by one. Hence, when the next bit is applied from countrol circuit 6A, it is located at point (15, 1) of memory 4, as can be seen in FIG. 8.

The foregoing will be repeated until the fifth bit comprising the vector *n* is inserted into cell (18, 4) of FIG. 8. At this time the contents of counter 16 are reduced to zero and thus clock gate 17 is inhibited from passing further clock pulses to counters 12 and 13 until counter 16 is reloaded with another vector length count.

As can be seen from the foregoing, there is described a unique character pattern generating method and apparatus for implementing the objects of the invention.

What is claimed is:

1. Apparatus for generating a character pattern comprising vector producing means for sequentially producing a plurality of vectors comprising said character pattern;

first storing means for storing said vectors where the configuration of said vectors in said first storing means corresponds to the configuration of said character pattern so that display or recording thereof is readily effected;

said vector producing means including second storing means for storing vector control words containing information about each of said vectors; and processing means for sequentially processing said vector control words to produce said plurality of vectors;

said first storing means having said vectors stored therein in accordance with a predetermined coordinate system and where the vector control words stored by said second storing means includes information on the coordinates of the starting point of each vector in said predetermined coordinate system, (b) the length of each vector and (c) the direction thereof; and said first storing means including a plurality of locations for storing bits of information and said processing means including a first coordinate axis counter for controlling said first storing means so that the first coordinate of the location of each bit stored in said first storing means is determined by said first coordinate axis counter, a second coordinate axis counter for controlling said first storing means so that the second coordinate of the said location is determined by said second coordinate axis counter; and means for sequentially loading said first and second coordinate axis counters with said information in said second storing means relating to said first and second coordinates.

2. Apparatus as in claim 1 where said processing means includes a vector length counter for controlling the number of said bits stored in said first storing means for each vector where the length of each vector varies in accordance with the number of bits comprising it; and means for sequentially loading said vector length counter with said information in said second storing means relating to said length of each vector.

3. Apparatus as in claim 2 where said processing means includes decoder means for controlling said first and second coordinate axis counters to change the contents thereof as each said bit is loaded into said first storing means so that the direction of each vector loaded into said first storing means corresponds to said information related to the direction of the vector stored in said second storing means; and means for sequentially loading said decoder means with said information in said second storing means relating to said direction of the vectors.

4. A method for generating a character pattern comprising the steps of sequentially producing a plurality of vectors comprising said character pattern;

storing said vectors in a first storing means where the configuration of said vectors in said first storing means corresponds to the configuration of said character pattern so that display or recording thereof is readily effected;

said vector producing step including the steps of storing in a second storing means, vector control words containing information about each of said vectors; and sequentially processing said vector control words to produce said plurality of vectors;

said first storing means has said vectors stored therein in accordance with a predetermined coordinate system and where the vector control words stored by said second storing means includes information on (a) the coordinates of the starting point of each vector in said predetermined coordinate system, (b) the length of each vector and (c) the direction thereof and said first storing means including a plurality of locations for storing bits of information and said processing step including the steps of controlling said first storing means so that the first coordinate of the location of each bit stored in said first storing means is determined by a first coordinate axis counter, controlling said first storing means so that the second coordinate of the said location is determined by a second coordinate axis counter; and sequentially loading said first and second coordinate axis counters with said information in said second storing means relating to said first and second coordinates.

5. A method as in claim 4 where said processing step includes the steps of controlling by a vector length counter the number of said bits stored in said first storing means for each vector where the length of each vector varies in accordance with the number of bits comprising it, and sequentially loading said vector length counter with said information in said second storing means relating to said length of each vector.

6. Apparatus as in claim 5 where said processing step includes the steps of controlling by a decoder means said first and second coordinate axis counters to change the contents thereof as each said bit is loaded into said first storing means so that the direction of each vector loaded into said first storing means corresponds to said information related to the direction of the vector stored in said second storing means; and sequentially loading said decoder means with said information in said second storing means relating to said directions of the vectors.

* * * * *